United States Patent Office 3,109,016
Patented Oct. 29, 1963

3,109,016
OZONOLYSIS PROCESS AND INTERMEDIATES IN THE MANUFACTURE OF 17-OXYGENATED 2-OXA-5α-ANDROSTAN-3-ONES
Leonard N. Nysted, Highland Park, and Raphael Pappo, Skokie, Ill., assignors to G. D. Searle & Co., Chicago, Ill., a corporation of Delaware
No Drawing. Filed Mar. 12, 1962, Ser. No. 179,190
7 Claims. (Cl. 260—468)

The present invention relates to a novel process in the manufacture of 17-oxygenated 2-oxa-5α-androstan-3-ones and to the novel intermediates formed by that process. Those 2-oxa compounds are represented by the formula

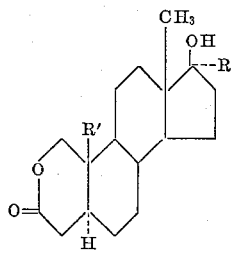

wherein R is hydrogen or a lower alkyl radical and R' is hydrogen or a methyl radical. They are potent anabolic agents, as is disclosed in the copending application of Raphael Pappo, Serial No. 158,577, filed December 11, 1961.

The aforementioned intermediates are represented by the formula

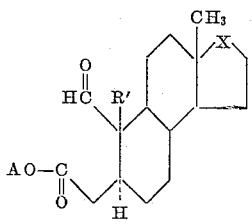

wherein R' is hydrogen or a methyl radical, X is a carbonyl, β-hydroxymethylene, β-(lower alkanoyl)oxymethylene, α-(lower alkyl)-β-hydroxymethylene, or α-(lower alkyl)-β-(lower alkanoyl)oxymethylene radical, and A is a methyl or formyl group.

The term lower alkyl encompasses, for example, methyl, ethyl, propyl, butyl, pentyl, hexyl, and the branched-chain radicals isomeric therewith.

Starting materials suitable for utilization in the instant process are represented by the formula

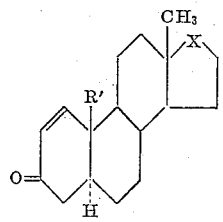

wherein R' and X have the identical meanings indicated above. Reaction of these substances with ozone produces the above-described intermediates. This process is preferably conducted at a temperature of −70° to 30° in an organic solvent medium consisting of a non-polar solvent and optionally including a polar solvent also. Typical non-polar solvents are methylene chloride, chloroform, carbon tetrachloride, and ethyl acetate, while the polar solvent is exemplified by the family of lower alkanols, i.e. methanol, ethanol, tertiary-butyl alcohol, etc. Preferably, a slight excess of ozone is used, the presence of excess reagent being detected by its characteristic blue color. Some advantages of the instant process over previously disclosed methods are the utilization of inexpensive reagents and relatively short reaction times, and the production of high yields.

When a polar solvent, for example methanol, is included in the process, intermediates of the formula

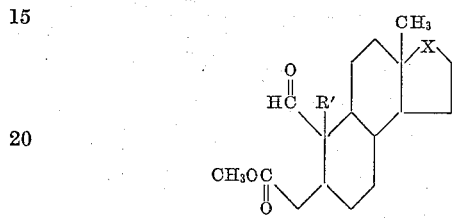

are obtained, while the process conducted in a non-polar solvent alone products intermediates of the formula

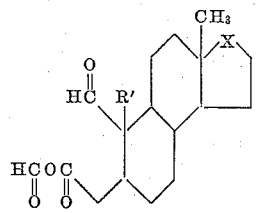

These processes are specifically illustrated by the reaction of 17β-hydroxy-17α-methyl-5α-androst-1-en-3-one in methylene chloride and methanol with ozone to produce methyl 17β-hydroxy-17α-methyl-1-oxo-1,2-seco-A-nor-5α-androstan-2-oate and, alternatively, with ozone in methylene chloride to yield 17β-hydroxy-17α-methyl-1-oxo-1,2-seco-A-nor-5α-androstan-2-oic formic anhydride.

The aforementioned 1,2-seco intermediates are converted to the corresponding anabolic 2-oxa compounds by treatment with a reducing agent in aqueous medium. Typically, the aforementioned methyl 17β-hydroxy-17α-methyl-1-oxo-1,2-seco-A-nor-5α-androstan-2-oate is contacted with sodium borohydride in aqueous sodium hydroxide, resulting in 17β-hydroxy-17α-methyl-2-oxa-5α-androstan-3-one.

The invention will appear more fully from the examples which follow. These examples are given by way of illustration only and are not to be construed as limiting the invention either in spirit or in scope. Temperatures are given in degrees centigrade (° C.), and quantities of materials in parts by weight unless otherwise noted.

*Example 1*

Into a solution of 10 parts of 17β-hydroxy-17α-methyl-5α-androst-1-en-3-one in 800 parts of carbon tetrachloride is bubbled, at −20°, a stream of oxygen containing 6–8% of ozone. The gas addition is continued until the presence of excess ozone is indicated by its characteristic blue color. A stream of nitrogen is passed through the mixture to purge it of the excess oxidant. The solid which separates is collected by filtration, dissolved in methylene chloride, and this solution is allowed to stand at room temperature for about 24 hours, then evaporated to dryness to afford 17β-hydroxy-17α-methyl-1-oxo-1,2-seco-A-nor-5α-androstan-2-oic formic anhydride. It displays infrared maxima at about 2.72, 2.85, 3.6–4.1, 5.57, 5.64, and 5.8 microns, and is represented by the formula

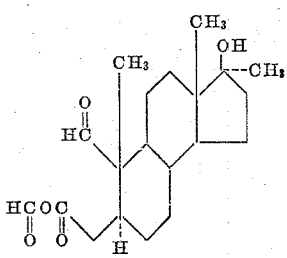

Example 2

A solution of 15 parts of 17β-hydroxy-17α-methyl-5α-androst-1-en-3-one in 200 parts of methylene chloride containing 240 parts of methanol is treated with ozone according to the procedure of Example 1. The reaction mixture, after it has been purged with nitrogen, is contrated to dryness and the resulting residue is recrystallized from aqueous methanol to yield crude methyl 17β-hydroxy - 17α - methyl-1-oxo-1,2-seco-A-nor-5α-androstan-2-oate, M.P. about 125–140°. Further purification is effected by adsorption of a benzene-hexane solution of this substance on silica gel followed by elution with 20% ethyl acetate in benzene to afford a pure sample melting at about 144–145°. It is represented by the formula

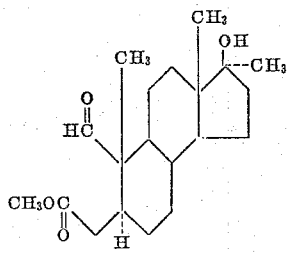

Example 3

An aqueous slurry of 6 parts of methyl 17β-hydroxy-17α - methyl-1-oxo-1,2-seco-A-nor-5α-androstan-2-oate in 100 parts of water containing 100 parts of methanol is made alkaline to pH 10 by the addition of dilute aqueous sodium hydroxide, then is treated with 6 parts of sodium borohydride. This mixture is allowed to react at room temperature for about 16 hours. Benzene is added, and the resulting mixture is acidified carefully with dilute hydrochloric acid. The benzene layer is then separated, and the aqueous layer is further extracted with benzene. The combined benzene extracts are washed successively with aqueous potassium bicarbonate and water, dried over anhydrous sodium sulfate, then evaporated to dryness in vacuo. The resulting residue is triturated with ether to afford pure 17β-hydroxy-17α-methyl-2-oxa-5α-androstan-3-one, M.P. about 235–238°; $[\alpha]_D = -23°$ (chloroform).

Example 4

The substitution of 6 parts of 17β-hydroxy-17α-methyl-1-oxo-1,2-seco-A - nor - 5α-androstan-2-oic formic anhydride in the procedure of Example 3 affords 17β-hydroxy-17α-methyl-2-oxa-5α-androstan-3-one, identical with the product of that example.

Example 5

The substitution of an equivalent quantity of 5α-androst-1-ene-3,17-dione or 17β-hydroxy-5α-androst-1-en-3-one in the procedure of Example 1, followed by reaction of the resulting products with sodium borohydride according to the process of Example 3, affords 17β-hydroxy-2-oxa-5α-androstan-3-one, M.P. about 198–203°.

Example 6

The substitution of an equivalent quantity of 17α-ethyl-17β-hydroxy-5α-androst-1-en-3-one in the procedure of Example 1, followed by reaction of the resulting product with sodium borohydride by the process of Example 3, affords 17α-ethyl-17β-hydroxy-2-oxa-5α-androstan-3-one, M.P. about 192–195°.

Example 7

By substituting an equivalent quantity of 17β-acetoxy-5α-androst-1-en-3-one and otherwise proceeding according to the processes of Example 1, a product is obtained, which product is converted by the procedure of Example 3 to 17β-hydroxy-2-oxa-5α-androstan-3-one, M.P. about 198–203°, identical with the product of Example 5.

Example 8

The substitution of an equivalent quantity of 17α-methyl-17β-propionoxy-5α-androst-1-en-3-one in the process of Example 1 yields a product which is allowed to react with sodium borohydride by the procedure of Example 3 to afford 17β-hydroxy-17α-methyl-2-oxa-5α-androstan-3-one, M.P. about 235–238°, identical with the product of Example 3.

What is claimed is:
1. Methyl 17β - hydroxy-17α-methyl-1-oxo-1,2-seco-A-nor-5α-androstan-2-oate.
2. 17β - hydroxy-17α-methyl-1-oxo-1,2-seco-A-nor-5α-androstan-2-oic formic anhydride.
3. A process which comprises contacting a compound of the formula

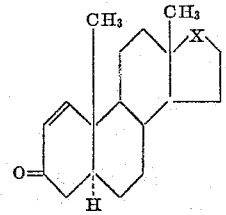

wherein X is selected from the group of radicals consisting of carbonyl, β-hydroxymethylene, and α-(lower alkyl)-β-hydroxymethylene, with ozone.

4. A process which comprises contacting a compound of the formula

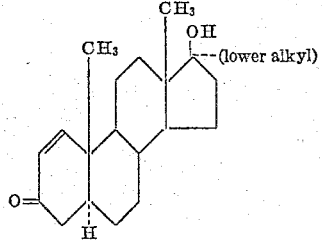

with ozone.

5. A process which comprises contacting 17β-hydroxy-17α-methyl-5α-androst-1-en-3-one with ozone.

6. A process which comprises contacting 17β-hydroxy-5α-androst-1-en-3-one with ozone.

7. A process which comprises contacting 5α-androst-1-ene-3,17-dione with ozone.

References Cited in the file of this patent

UNITED STATES PATENTS

| | | |
|---|---|---|
| 2,897,202 | Wildi | July 28, 1959 |
| 3,023,227 | Atwater | Feb. 27, 1962 |

OTHER REFERENCES

Huffman: Jour. Amer. Chem. Soc., volume 70 (1948), page 4268.